E. A. GRAHAM.
TELEPHONIC APPARATUS.
APPLICATION FILED JULY 28, 1910.

1,020,898.

Patented Mar. 19, 1912.

6 SHEETS—SHEET 1.

Witnesses:
E. R. Peck
L. L. Burket

Inventor:
Edward A. Graham
by Hubert Peck
att

E. A. GRAHAM.
TELEPHONIC APPARATUS.
APPLICATION FILED JULY 28, 1910.

1,020,898.

Patented Mar. 19, 1912.
6 SHEETS—SHEET 2.

Witnesses:
E. R. Peck
L. L. Burket

Inventor:
Edward A. Graham
by Hubert E Peck
atty

E. A. GRAHAM.
TELEPHONIC APPARATUS.
APPLICATION FILED JULY 28, 1910.

1,020,898.

Patented Mar. 19, 1912.

6 SHEETS—SHEET 3.

Fig. 4.

Witnesses:
E. R. Peck
S. L. Burket

Inventor:
Edward A. Graham
by Hubert E. Peck
atty

E. A. GRAHAM.
TELEPHONIC APPARATUS.
APPLICATION FILED JULY 28, 1910.
1,020,898.
Patented Mar. 19, 1912.
6 SHEETS—SHEET 4.
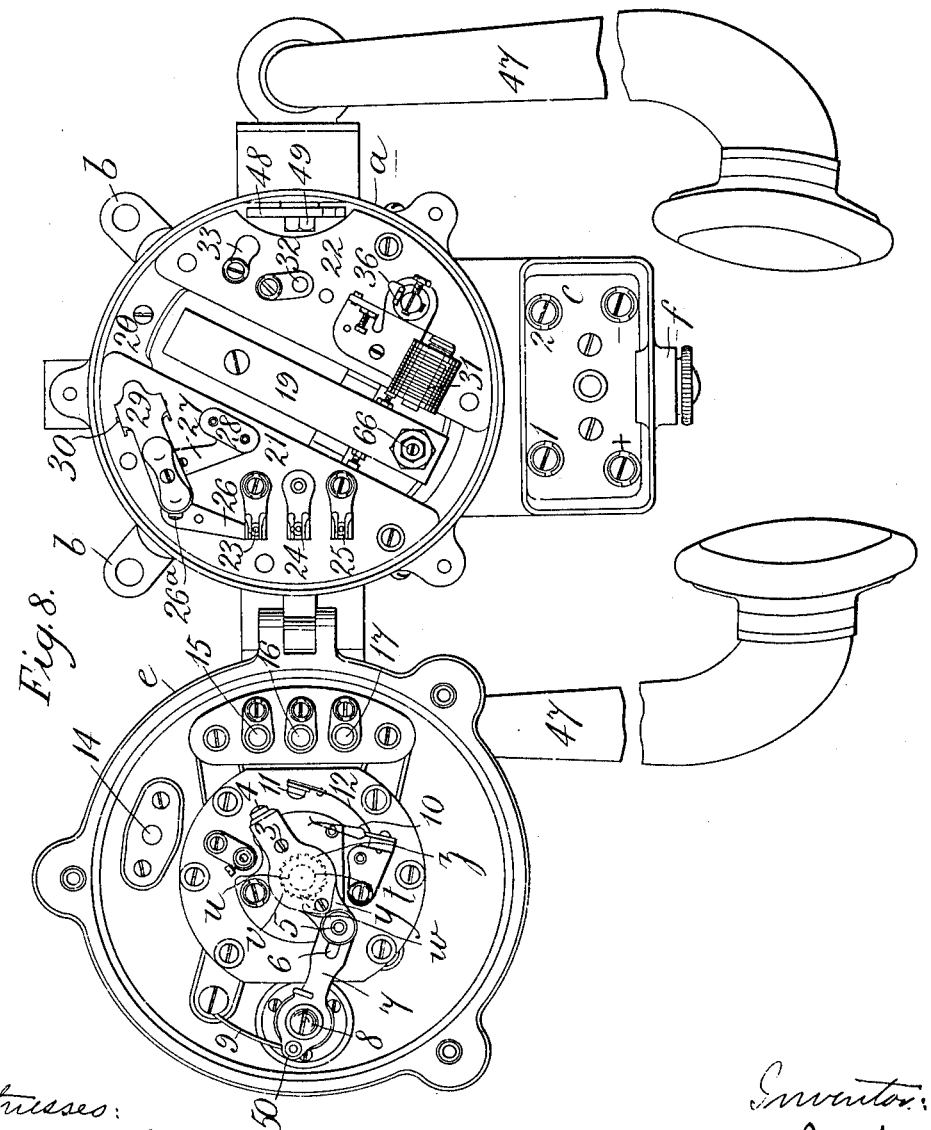

E. A. GRAHAM.
TELEPHONIC APPARATUS.
APPLICATION FILED JULY 28, 1910.
1,020,898.
Patented Mar. 19, 1912.
6 SHEETS—SHEET 5.
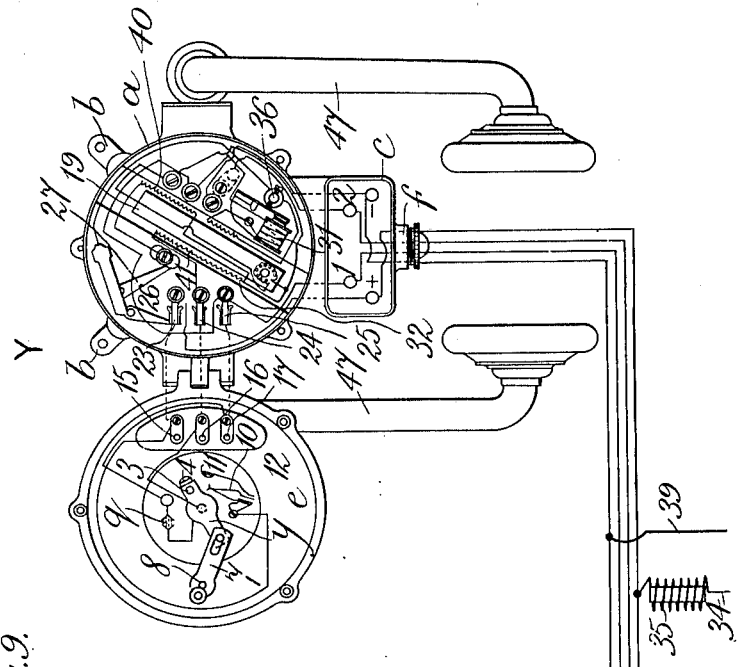
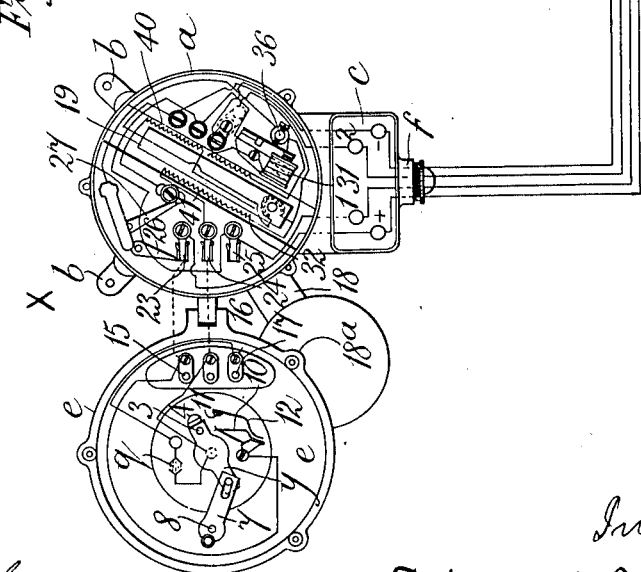
Fig. 9.
Witnesses:
E. R. Peek
L. L. Burket
Inventor:
Edward A. Graham
by Hubert D. Peek
atty

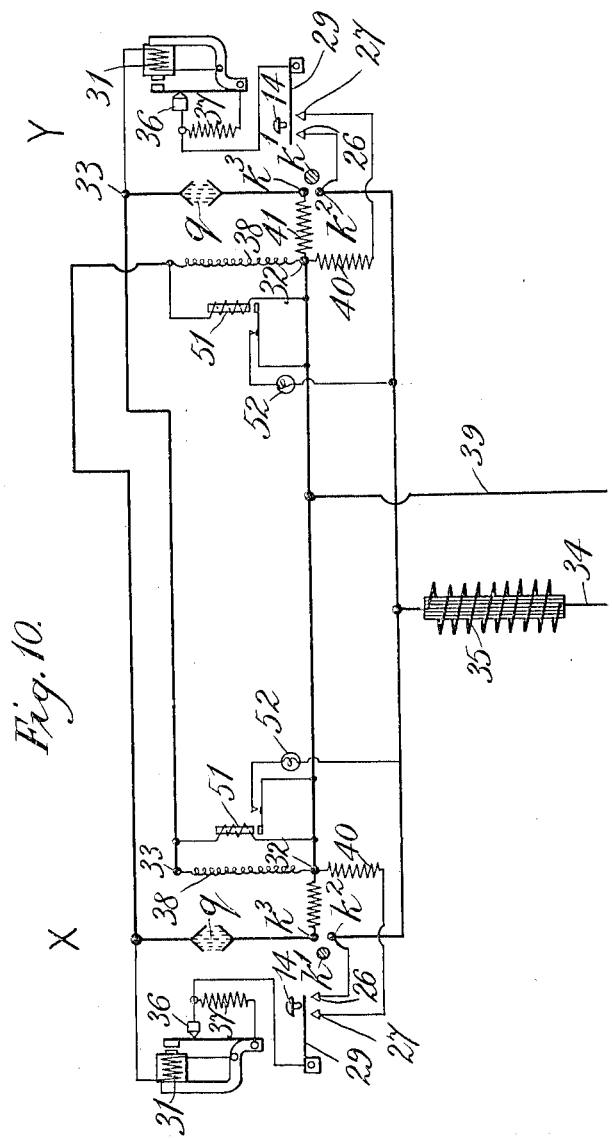

UNITED STATES PATENT OFFICE.

EDWARD ALFRED GRAHAM, OF BROCKLEY, ENGLAND.

TELEPHONIC APPARATUS.

1,020,898.  Specification of Letters Patent.  Patented Mar. 19, 1912.

Application filed July 28, 1910. Serial No. 574,359.

*To all whom it may concern:*

Be it known that I, EDWARD ALFRED GRAHAM, a subject of the King of Great Britain and Ireland, residing at Brockley, in the county of London, England, have invented Improvements in or Relating to Telephonic Apparatus, of which the following is a specification.

This invention relates to water tight telephonic apparatus of the now well known kind in which the transmitter and receiver and the switch and electrical connections are mounted within a single casing, and it has for its object to effect certain detail improvements tending, individually, to secure even greater reliability, efficiency and simplicity than heretofore, and collectively producing a complete loud speaking instrument which can be connected in circuit to receive and transmit calls by voice and by a distinctive calling device, alternatively, as hereinafter set forth.

Figure 1:
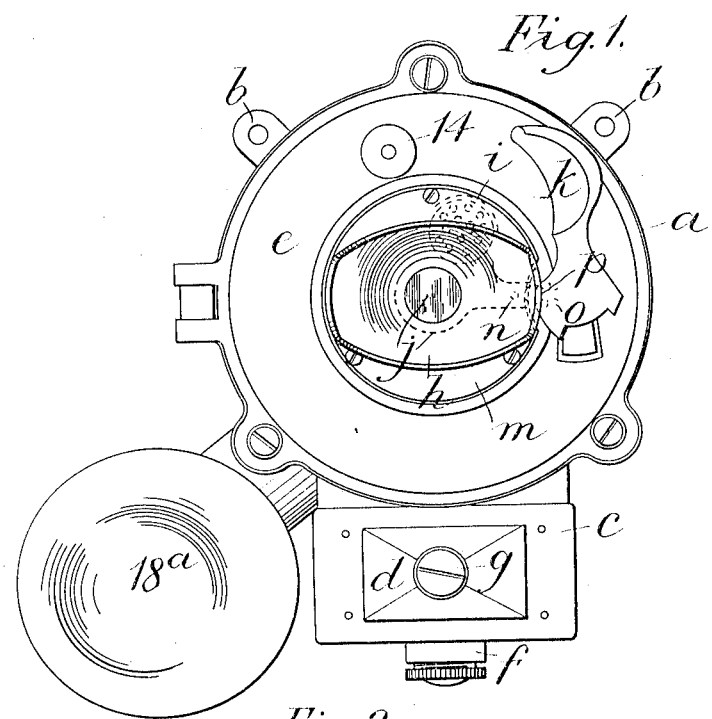
Figure 2:
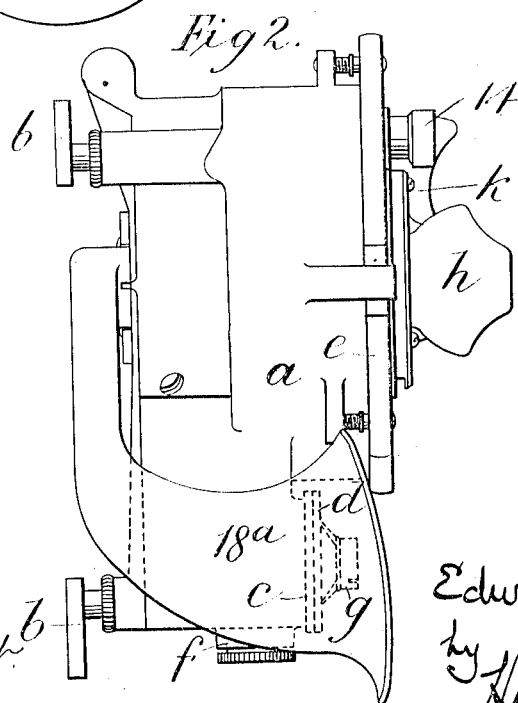
Figure 3:
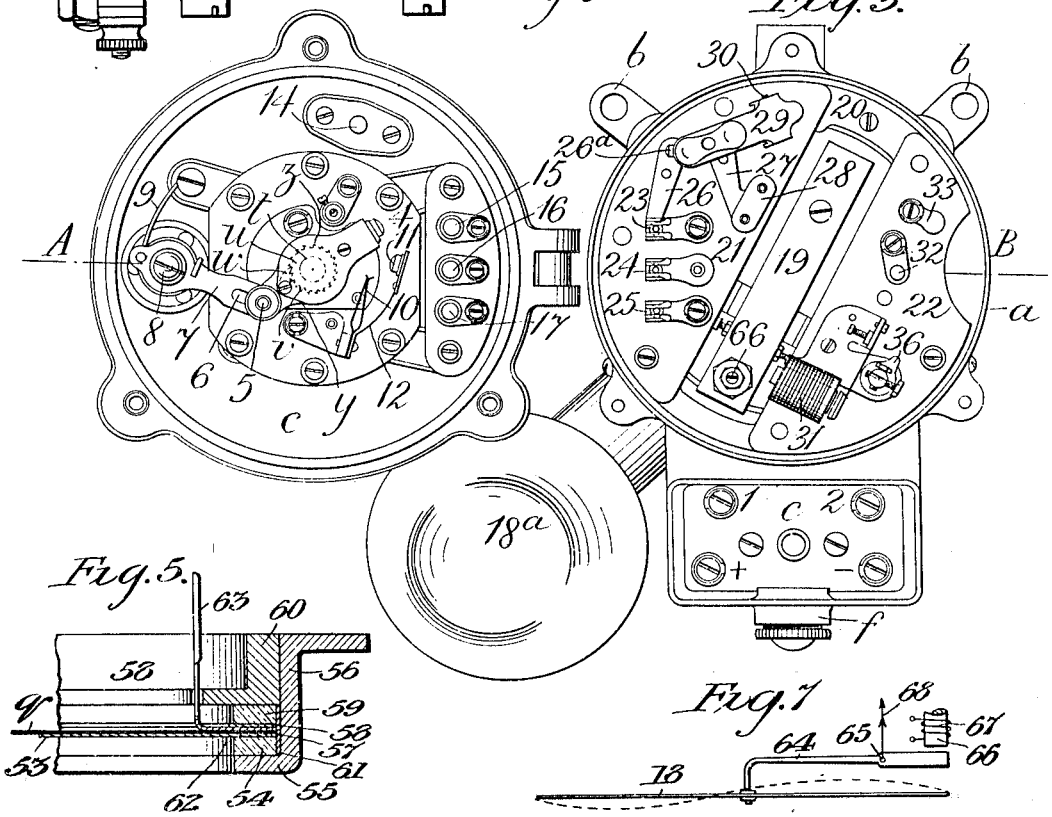

In the accompanying drawings, Figure 1 is a front elevation and Fig. 2 a side elevation of one construction of instrument embodying the invention. Fig. 3 is a front elevation of the instrument as it appears when open and Fig. 4 is a horizontal section taken on the line A—B of Fig. 3, the instrument however being partly closed. Fig. 5 is a section to a larger scale of a detail of Fig. 4. Fig. 6 is a side elevation of a portion of the receiver of the instrument shown in Fig. 4 and Fig. 7 is a diagram pertaining thereto. Fig. 8 is a view corresponding to Fig. 3 illustrating a modification. Fig. 9 is a diagram showing the mode of connecting together two instruments, and the internal wiring thereof, one instrument being of the form according to Figs. 1 to 5 and the other instrument of the modified form according to Fig. 8. Fig. 10 is a diagram with the aid of which the mode of operation of the system can be more easily described.

Referring first to Figs. 1 to 7 inclusive, *a* is the case which, in known way, is provided with supporting means *b* for minimizing transmission of shock to the apparatus, but which in accordance with the present invention is formed with a separate junction box *c* having a removable cover *d* so that access can be easily obtained to the terminals for the incoming line wires for testing of cables or of the apparatus, without opening the main cover *e* of the instrument. The terminals in the box *c* are four in number marked respectively 1, 2, +, —, (see Fig. 3) the line conductors passing through a water-tight gland *f* into the box the cover whereof is secured by a screw *g*. The cover *e* which, also in known way, is hinged to the case *a*, has a sound director or mouth piece *h* so shaped that the user may speak very closely into the instrument and concentrate the sound on to the diaphragm of the transmitter.

The transmitter, which is of the carbon granule type, is preferably protected by a grating *i*, but in lieu of this being stationary, as heretofore, it forms part of a shutter plate *j* that normally acts to close the inner end of the mouth piece *h* (see Figs. 1 and 4) and is moved to bring the grating into register with such end of the mouth piece only by operation of the hand lever *k* of the switch that serves to put the transmitter and receiver in circuit. For this purpose, the mouth piece *h* may be formed with a housing *m* (Fig. 4) to receive the plate *j* which is pivoted thereto at *n* and has a bifurcated portion *o* engaged by a lug *p* on the lever *k*. As will be obvious, the shutter plate *j* affords more complete protection to the transmitter diaphragm than the grating would when the instrument is not in use.

The transmitter comprises, as shown more particularly in Figs. 4 and 5, a carbon diaphragm *q* and a protective diaphragm 53 of mica or the like held in contact in a holder in such a manner as to prevent their being subjected to uneven stresses such as obtain when the parts are secured together by screws and which produce strains that affect the efficiency of the transmitter. For this purpose, the packing rings between which the diaphragms are clamped are held in position by a ring forced into the diaphragm holder. In the example illustrated, the mica diaphragm 53 abuts directly against a washer 54 of more or less elastic or yielding material held in position by means of the flange 55 of a metal ring 56 constituting part of the diaphragm holder. A ring 57 of thin sheet metal, for example copper, is placed against the rear side of the carbon diaphragm *q*, a washer 58 of mica is placed against the metal ring and then a second washer 59 of insulating material similar to the washer 54 is placed against the mica washer 58, the holder being completed by forcing into the ring 56 a metal ring 60. The ring 56 is provided at 61 with an annular lining of insulating material, for example a strip of mica, to prevent the diaphragm $q$ making peripheral contact with such ring, and the holder when complete may be given an application of waterproof paint or enamel at the region marked 62. The metal ring 57 is provided with a strip-like extension 63 for connecting up the ring 57, and consequently the carbon diaphragm $q$, in the circuit of the transmitter. The arrangement is such that complete water and air tightness is secured, while the diaphragms $q$ and 53 are clamped with an equal pressure all around so that no strain is imposed upon either of them. It will be seen that electrical leakage from the diaphragm $q$ is effectually prevented by the outer diaphragm 53 thus enabling the insulation resistance to be maintained and avoiding the possibility of faults occurring by accumulation of moisture between the diaphragm $q$ and the holder 55—56. The transmitter is provided with a rear electrode $r$ which, while revoluble to secure the well known effect of agitating the carbon granules $r^1$ in contact with it and the diaphragm $q$, is operated in a special manner from the switch hand lever $k$ so that it is rotated intermittently in one direction only, that is to say, it is moved with movement of the hand lever to close the switch but not when opening the switch. The result is that the wear of the felt or like material of the granule retaining ring $s$ (Fig. 4) is materially reduced. This intermittent rotation of the electrode $r$ is effected by fitting upon the carrying spindle $t$ of the electrode $r$ a sleeve $u$ having ratchet teeth $v$ adapted to be engaged by a pawl $w$ (Fig. 3) pivoted within the box portion $x$ of a switch member $y$ movable upon the sleeve $u$ and closed by a cover plate $z$ (Fig. 4) carrying a contact pin 3 and a carbon block 4. The member $y$ carries an insulated pin 5 which engages a slot 6 in a lever 7 secured to the switch spindle 8 which is encircled by a spring 9 to return the parts to the position illustrated after they are moved therefrom by operation of the lever $k$. The stationary switch member comprises a pair of spring blades 10, coöperating with the contact pin 3, and a carbon block 11 carried by a spring blade 12 for coöperation with the carbon block 4, the arrangement being such that the initial make and final break take place between the carbon blocks 4 and 11.

To resist turning movement of the rear electrode in a direction reverse to that in which it is positively driven by the ratchet and pawl mechanism, a cupped spring washer 13 may be provided to act as a brake, the said washer bearing against a plate $13^a$ fixed to the back of the holder or casing $13^b$ of the transmitter. A bell or call push 14 and three terminal pins 15, 16, 17 essentially complete the cover equipment.

The receiver mechanism in the case $a$ comprises a diaphragm 18 which, with its lever system, is given an initial mechanical stress in order to secure increased loudness and clearness of tone. As shown more particularly in Figs. 3, 4 and 6, the diaphragm 18 is rigidly attached at its central portion to one end of a lever 64 which is pivoted at 65 to the bifurcated extremity of one limb of a permanent magnet 19, the extremity of the other limb of such magnet being provided with an endwise adjustable pole piece 66 surrounded by an electromagnetic winding 67. The limb to which the pole piece 66 is applied is longer than the other limb of the magnet 19 and the lever 64 being polarized, by reason of its connection to the magnet, is attracted to the pole piece 66 with a force adjustable by altering the position of the pole piece 66. The initial mechanical stress referred to may be applied, as shown for example in Fig. 7, by displacing the fulcrum 65 slightly in the direction of the arrow 68 from the position it would assume were the diaphragm 18 to occupy the full line position, with the result that the diaphragm is distorted somewhat as is indicated, to an exaggerated scale, by the dotted lines. In use, the variation in strength of the line current will energize the electromagnetic winding 67 to varying extents and so augment to different degrees the mechanical stress initially imparted to the diaphragm 18 and produce the required vibrations with a much better definition of speech than has hitherto been usual.

$18^a$ is a trumpet shaped sound tube having its inner end mounted to turn on the back of the case $a$ opposite the diaphragm 18 and the outer end extending toward the front of the instrument as before. In addition, there is arranged in the case $a$ a circular frame 20 carrying two segmental insulating blocks 21, 22. On the block 21 are mounted spring blade contact terminals 23, 24 25 coöperating respectively with the terminal pins 15, 16, 17 of the cover. A spring 26, carrying a carbon block $26^a$, extends from the blade terminal 23 and a similar spring 27 carrying a carbon block extends from the terminal block 28, the carbon blocks of both springs being adapted to be bridged by corresponding carbon blocks on a contact lever 29 coöperating with the call push 14. The lever 29 is hinged at 30 to a support on the block 21 and is normally held in open position by a suitable spring, not shown. On the block 22 are mounted a "buzzer" or interrupter 31 affording a distinctive call note, and two terminals 32, 33.

It will now be convenient to continue the description with reference to the diagram Fig. 10. Assuming that it is desired to call attention at station Y when the user at station X requires to communicate therewith, then the call push 14 at station X is depressed to cause the carbon blocks of the springs 26, 27 to be bridged by the lever 29. A circuit is thus completed from the positive supply line 34 through the inductance 35, spring 26 and lever 29 to the terminal 36 of the "buzzer" or interrupter 31, the make and break of which is shunted by a resistance 37 so that sparking is practically eliminated and a pure low penetrating note given by the receiver. From the "buzzer" 31 the current, which is now of an undulatory character, passes through the windings of the receiver 38 at station Y and back through the negative supply line 39. In order that the fluctuations of the current may not be damped by the inductance 35, the circuit containing the "buzzer" 31 and the receiver 38 is paralleled by a shunt resistance 40 connected between terminals 27 and 32 of the instrument at station X. The resistance 37 in addition to preventing sparking, maintains a small constant current through the circuit so that relays or other signal gear associated with say an exchange switch board may be positively operated. The noise of the "buzzer" in the instrument at station X can be plainly heard and affords an indication that the receiver 38 at station Y is receiving the call current.

By operation of the switch lever $k$ (Fig. 1), a voice call can be given as the receiver 38 is always in circuit. In speaking, the current will flow through the inductance 35, the switch $k^1$, $k^2$, $k^3$ closed by the switch lever $k$ and transmitter $q$ of the instrument at station X and the receiver 38 at station Y and thence to the negative line 39. At the switch $k^1$ $k^2$ $k^3$ of the instrument at station X, a shunt circuit to the transmitter $q$ and receiver 38 is provided by a resistance 41, so that the fluctuations set up by the transmitter $q$ are reproduced in the receiver 38 of the instrument at station Y with full efficiency irrespective of the value of the inductance 35.

The operations for calling and conversation described as originating from station X to station Y apply to the corresponding circuits from station Y to station X.

The mode of effecting the internal connections of the instruments will now be intelligible with the aid of the diagram Fig. 9.

When the apparatus is employed on a non-inductive circuit, such as when a battery is used, the resistances 40 and 41 are disconnected.

The instrument shown in Fig. 8 differs only from that described with reference to Figs. 1 to 7 in that two hearing tubes are employed, one, 47, of which is adapted to rock the switch spindle 8 through a forked member 48 pivoted within the case $a$ at 49 and engaging a roller 50 on the switch member $y$.

In a direct working arrangement, such as shown in Fig. 10, in which a transmitter $q$ in one instrument is placed in series with a receiver 38 in a distant instrument, a relay 51 may be connected across each receiver to close a circuit across the positive and negative conductors through an indicating device, as for example an incandescent electric lamp 52, for the purpose of indicating, where several instruments are located near together, from which of them the calling sound is proceeding.

What I claim is:—

1. A loud speaking telephone instrument, comprising a casing having a stationary mouth piece, a transmitter and a receiver in such casing, a revoluble rear electrode cooperating with the transmitter diaphragm, a switch for connecting the transmitter in circuit when conversation is desired, means operated by the switch and adapted, while the switch is being closed, to rotate the rear electrode but only while the switch is being closed, a "buzzer" inside the casing and a push operated from without the casing for connecting the "buzzer" in a call circuit.

2. In a telephone instrument, a transmitter and receiver adapted at one end to be connected respectively to separate electric supply mains and at the other end to separate line wires for connection to a separate instrument, a distinctive calling device comprising an automatic circuit maker and breaker adapted to be connected to one of said line wires and a switch device for connecting said device to a supply main.

3. In a telephone instrument, a transmitter and receiver adapted at one end to be connected respectively to separate electric supply mains and at the other end to separate line wires for connection to a separate instrument, a distinctive calling device comprising an automatic circuit maker and breaker adapted to be connected to one of said line wires, a resistance connected in shunt to said device, and a switch device for connecting said device to a supply main.

4. A telephone instrument comprising a transmitter and receiver adapted at one side to be connected to separate line wires, a resistance connecting the other or second sides of said transmitter and receiver, a switch for connecting the second side of the transmitter to one of the supply mains of an inductive circuit, the second side of the receiver being adapted to be connected to another electric supply main of said circuit, a second resistance connected to said second side of said receiver, a distinctive calling device adapted to be connected on one side to the line wire for connection with the telephonic receiver of a distant instrument and a switch for connecting the other side of the said device to the supply main to which the second side of said transmitter is connected and to the second resistance.

5. In a telephone instrument, a casing, a transmitter and receiver therein the transmitter having a revoluble electrode, a mouthpiece behind which the transmitter is disposed, a movable shutter plate, formed with a grating, between the mouthpiece and transmitter and a switch, for connecting the transmitter and receiver in circuit, adapted to simultaneously rotate the transmitter electrode and move the shutter plate so as to bring its grating into register with the mouthpiece.

6. A loud speaking telephone instrument, comprising a casing having a stationary mouth piece, a transmitter with diaphragm behind the mouth piece, a revoluble rear electrode coöperating with the transmitter diaphragm, a receiver, a shutter plate disposed between the mouth piece and the transmitter diaphragm, a switch for connecting the transmitter in circuit when conversation is desired, means operated by the switch and adapted, while the switch is being closed, to rotate the rear electrode but only while the switch is being closed, and means also operated by the switch for moving the shutter plate so that the grating portion is brought into register with the mouth piece while speaking.

7. A loud speaking telephone instrument, comprising a casing having a stationary mouth piece, a transmitter with diaphragm behind the mouth piece, hearing means communicating with the casing, a receiver between the hearing means and casing, a revoluble rear electrode coöperating with said transmitter diaphragm, a spindle fixed to said rear electrode, a ratchet wheel fixed to the spindle, a switch comprising fixed and movable members for connecting said transmitter in circuit, said movable switch member being mounted to oscillate about said spindle, a pawl carried by said movable switch member and engaging said ratchet wheel and switch operating mechanism connected to the said movable switch member.

8. A loud speaking telephone instrument, comprising a casing having a stationary mouth piece, a transmitter with diaphragm behind the mouth piece, a receiver, a revoluble rear electrode coöperating with said transmitter diaphragm, a spindle fixed to said rear electrode, a ratchet wheel fixed to the spindle, a switch comprising fixed and movable members for connecting said transmitter in circuit, said movable switch member being mounted to oscillate about said spindle, a pawl carried by said movable switch member and engaging said ratchet wheel and switch operating mechanism connected to the said movable switch member.

Signed at London England this 24th day of June 1910.

EDWARD ALFRED GRAHAM.

Witnesses:
EDMUND EUGENE BARNARD,
HENRY WILLIAM DIPROSE.